F. E. SMITH & F. W. CURNAN.
MECHANISM FOR MAKING STAY TIPS.
APPLICATION FILED MAY 17, 1918.

1,284,803.

Patented Nov. 12, 1918.
2 SHEETS—SHEET 1.

INVENTORS
Frederick E. Smith and
Frank W. Curnan
BY
A. M. Wooster
ATTORNEY

F. E. SMITH & F. W. CURNAN.
MECHANISM FOR MAKING STAY TIPS.
APPLICATION FILED MAY 17, 1918.

1,284,803.

Patented Nov. 12, 1918.
2 SHEETS—SHEET 2.

INVENTORS
Frederick E. Smith
Frank W. Curnan
BY
A. M. Wooster
ATTORNEY

UNITED STATES PATENT OFFICE.

FREDERICK E. SMITH AND FRANK W. CURNAN, OF DERBY, CONNECTICUT.

MECHANISM FOR MAKING STAY-TIPS.

1,284,803.  Specification of Letters Patent.  Patented Nov. 12, 1918.

Application filed May 17, 1918. Serial No. 235,153.

*To all whom it may concern:*

Be it known that we, FREDERICK E. SMITH and FRANK W. CURNAN, citizens of the United States, residing at Derby, county of New Haven, State of Connecticut, have invented an Improvement in Mechanism for Making Stay-Tips, of which the following is a specification.

This invention relates to the manufacture of metallic tips for corset stays and similar articles, and has for its object to produce mechanism for making stay tips, that will enable us to greatly reduce the cost of production by making a plurality of tips simultaneously, and by preventing the greater portion of the scrap which has been unavoidable in any method of making stay tips heretofore devised, so far as we are aware.

With these objects in view, we have devised the novel mechanism hereinafter described, the essential features of which are that a relatively wide strip of metal is first slitted into blank strips of the required width, then cut into blanks of the required length and with rounded ends, and the blanks are then formed into the required shape by a plurality of punches acting simultaneously.

Figure 1:
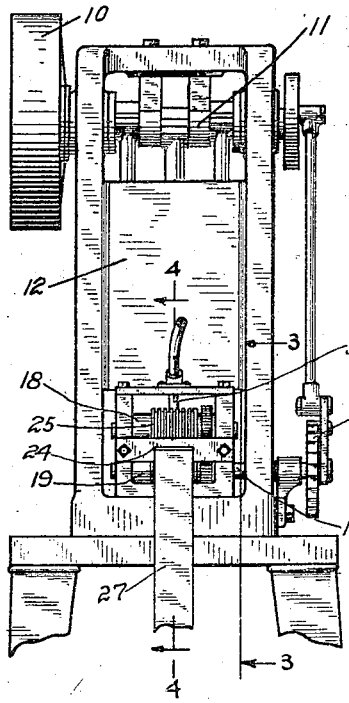
Figure 2:
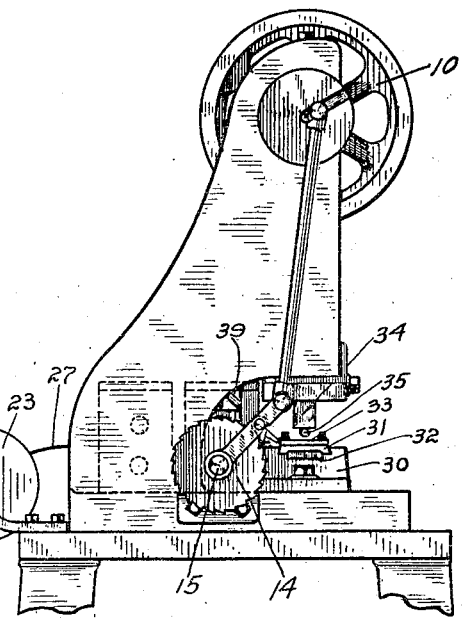
Figure 3:
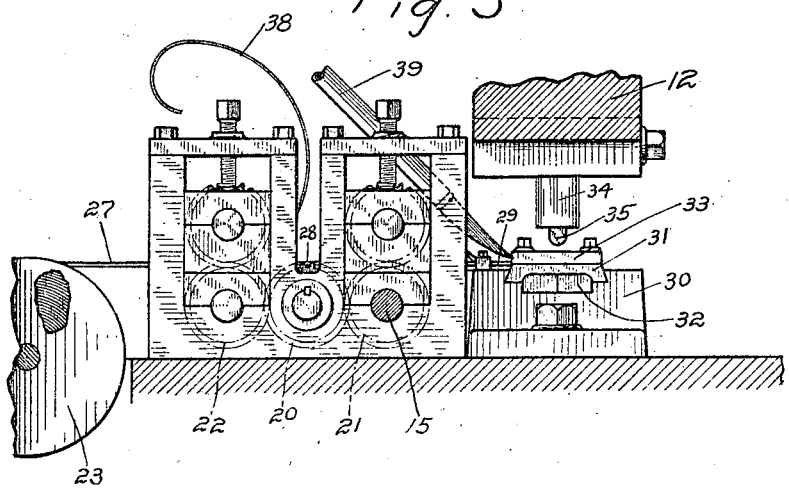
Figure 4:
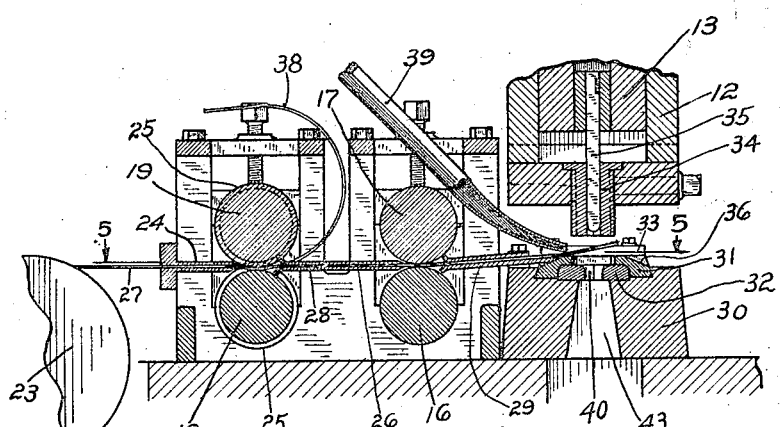
Figure 5:
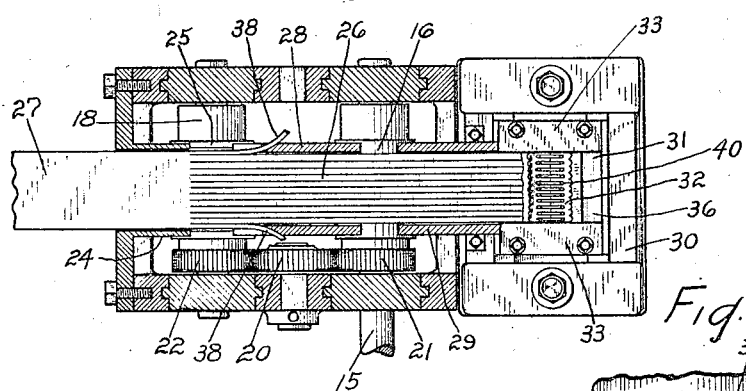
Figures 6, 7, 8:
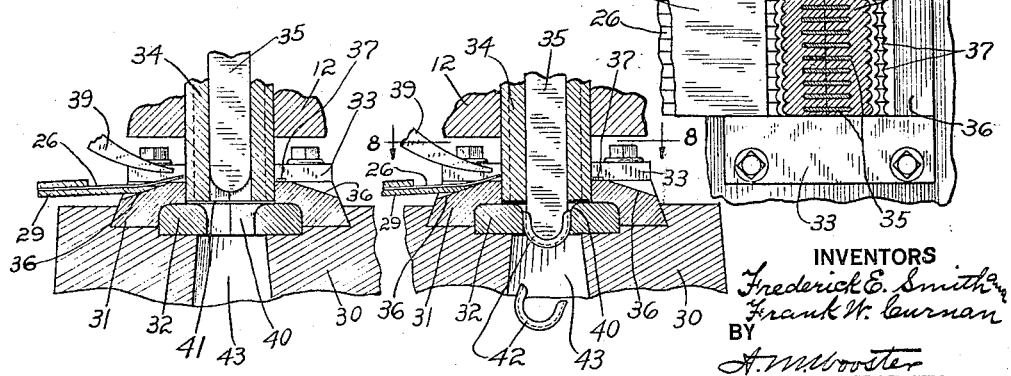

In the accompanying drawing forming a part of this specification, Figure 1 is a rear elevation of a power press, showing our novel mechanism mounted thereon;

Fig. 2, a side elevation as seen from the right in Fig. 1;

Fig. 3, an elevation on an enlarged scale, partly in section on the line 3—3 in Fig. 1, looking in the direction of the arrows;

Fig. 4, a section on the line 4—4 in Fig. 1, looking in the direction of the arrows;

Fig. 5, a section on the line 5—5 in Fig. 4, looking in the direction of the arrows;

Figs. 6 and 7 are sectional views, on a still larger scale, corresponding with Fig. 4 and illustrating successive steps in the operation of the punches, and Fig. 8 is a section on the line 8—8 in Fig. 7, looking in the direction of the arrows.

The press illustrated is an ordinary double acting power press and is not thought to require description in detail, as specifically it forms no part of the present invention. Power is applied by means of a belt, not shown, passing over a fly wheel 10, on a double throw crank shaft 11. The cranks on this shaft operate an outer slide 12, and an inner slide 13, see Fig. 4, in connection with Fig. 1. A ratchet feed, operated from this shaft and indicated as a whole by 14, drives a shaft 15. 16 and 17 denote the feed rolls and 18 and 19 the slitting rolls. The feed roll and slitting roll shafts carry intermeshing gear wheels, an idler 20 being interposed between the gear wheels 21 and 22 on the lower feed and slitting roll shafts, the ratchet feed and gear wheels co-acting to produce uniform intermittent rotation of the feed and slitting rolls. The strip of metal to be operated upon, indicated by 27, is carried by a drum 23, and passes through a guide 24 to the slitting rolls. The slitting rolls are provided with interlocking angular ribs 25, each rib being just the width of a blank strip 26. The operation of the slitting rolls is therefore to slit strip 27 into blank strips 26 without waste, except the narrow strips necessarily trimmed from the edges of strip 27. The blank strips pass through a guide 28, between the slitting rolls and the feed rolls, and are drawn forward intermittently by the latter. In front of the feed rolls is another guide 29 through which the blank strips pass to the tip forming mechanism.

30 denotes the die block, 31 the upper die, which has but one opening and 32 the lower die, which is shown as made in two parts. The lower die is recessed into and is retained in place by the upper die, and the latter is retained in place by guide blocks 33, bolted to the die block. 34 denotes the blanking punch which is carried by outer slide 12, and 35 the forming punches which are carried by inner slide 13. The blanking punch is shown as made in two parts. It is provided with a series of slots 40 in which the forming punches slide and its front and rear faces consist of series of convex scallops, which coöperate with corresponding concave recesses in the faces of the upper die opening to cut the blank strips into blanks rounded at each end, as required, to produce ordinary commercial stay tips. This portion of the operation will be clearly understood from Fig. 6.

It will be noted that the upper die is beveled, as at 36, on both its rear and forward sides, making it reversible, and that the top of the die lies above the normal path of travel of the blank strips. This is in order to incline the forward ends of the blank strips upward so as to prevent the possibility of their engaging the forward edge of the die opening. As the rear edge of the blanking punch leaves the forward ends of the blank strips with a concave curve, and as both ends of the blanks must be convex curves, it follows that the feeding movement must carry the forward ends of the blank strips slightly beyond the forward edge of the upper die opening. The result is that short pieces of scrap, indicated by 37, are formed in trimming the forward ends of the blanks. These short pieces of scrap and the edge trimmings, indicated by 38, comprise all the scrap made in the entire operation of forming the stay tips from the original strip of metal, there being no waste whatever between the tips transversely, that is, there is no sheet of scrap remaining after the strip has passed through the tip forming mechanism. The edge trimmings 38 do not pass into guide 28 and naturally curl upward out of the way as shown. The short scraps 37 are carried forward and prevented from falling into the die opening, when the punches rise, by puffs of air delivered through a pipe 39, having a widened nozzle.

Fig. 6 shows the position of the parts at the end of the movement of the blanking punch, a blank, indicated by 41, (one of the series) being shown as lying upon the top of the lower die. An instant later the forming punches move downward, as in Fig. 7, and force the blanks through the slots 40 in the lower die. The forming punches and the slots in the lower die are so laid out as to coöperate in forming each blank into a completed stay tip, indicated by 42. These stay tips may be described as U-shaped in elevation and trough-shaped in cross section. The forming punches force the completed articles entirely through the lower die and they drop out through an opening 43 in the die block. Each actuation of the mechanism therefore produces a number of completed articles corresponding with the number of forming punches in the series.

Having thus described our invention, we claim:

1. Mechanism for making stay tips and similar articles, comprising means for slitting a strip of metal into blank strips, a blanking punch and a blanking die for simultaneously cutting the blank strips into blanks, and a plurality of forming punches and a coöperating die, whereby the blanks are simultaneously formed into completed articles.

2. Mechanism for making stay tips and similar articles, comprising means for slitting a strip of metal into blank strips, a blanking punch and coöperating die for simultaneously cutting the blank strips into blanks and rounding the ends of the blanks, and a plurality of forming punches and a coöperating die, whereby the blanks are simultaneously formed into completed articles.

3. Mechanism for forming stay tips and similar articles comprising intermittently operated slitting rolls and feed rolls, whereby a strip of metal is formed into blank strips and the blank strips are fed forward, a lower die having a plurality of slots, an upper die, a blanking punch coöperating with the upper die by which the blank strips are cut into blanks and the blanks are carried to the lower die, and a plurality of forming punches adapted to pass through the slots in the lower die, whereby the blanks are carried through the slots in the lower die and formed to shape.

4. Mechanism for forming stay tips and similar articles comprising means for slitting a strip of metal into blank strips, a lower die having a plurality of slots, an upper die, a blanking punch coöperating with the upper die, and a plurality of forming punches adapted to pass through the slots in the lower die, whereby blanks are simultaneously cut from the blank strips and then the blanks are simultaneously formed to completed articles.

5. Mechanism for forming stay tips and similar articles comprising means for slitting a strip of metal into blank strips, a lower die having a plurality of slots, an upper die having an opening, the front and rear edges of which consist of concave recesses, a blanking punch having front and rear faces with convex scallops corresponding with the recesses, and a plurality of forming punches adapted to pass through the slots in the lower die, whereby blanks are simultaneously cut from the blank strips, both ends of the blanks are rounded, and then the blanks are simultaneously formed to completed articles.

6. Mechanism for forming stay tips comprising means for slitting a strip of metal into blank strips, an upper die having an opening, the front and rear edges of which consist of concave recesses, a blanking punch having front and rear faces with convex scallops corresponding with the recesses, and a plurality of forming punches adapted to pass through the slots in the lower die, whereby blanks are simultaneously cut from the blank strips, both ends of the blanks are rounded, and then the blanks are simultaneously formed into stay tips U-shaped in elevation and trough shaped in cross section.

7. Mechanism for forming stay tips and similar articles comprising rolls provided with interlocking angular ribs, whereby a strip of metal is slitted into blank strips, a blanking punch and die for simultaneously cutting blanks from the blank strips, and forming punches and a coöperating die, whereby the blanks are simultaneously formed into completed articles.

8. Mechanism for forming stay tips and similar articles comprising rolls provided with interlocking angular ribs, for the purpose set forth, a blanking punch and die, whereby blanks are simultaneously cut from the blank strips and the ends of the blanks rounded, and a plurality of forming punches and a corresponding die, whereby the blanks are formed to shape.

In testimony whereof we affix our signatures.

FREDERICK E. SMITH.
FRANK W. CURNAN.

Copies of this patent may be obtained for five cents each, by addressing the "Commissioner of Patents, Washington, D. C."